United States Patent [19]

Raviele

[11] Patent Number: 5,731,942
[45] Date of Patent: Mar. 24, 1998

[54] LOAD PROTECTOR

[76] Inventor: Thomas E. Raviele, 19346 Country Club Dr., Tequesta, Fla. 33469

[21] Appl. No.: 706,312

[22] Filed: Aug. 30, 1996

[51] Int. Cl.⁶ ............................................. H02H 3/00
[52] U.S. Cl. ............................ 361/75; 361/71; 361/59
[58] Field of Search ............................ 361/59, 71–75

[56] References Cited

U.S. PATENT DOCUMENTS 3,809,963   5/1974   Hutchinson ...................... 361/75
5,097,379   3/1992   Walton et al. ..................... 361/75

*Primary Examiner*—Jeffrey A. Gaffin
*Assistant Examiner*—Sally C. Medley
*Attorney, Agent, or Firm*—McHale & Slavin

[57] ABSTRACT

The instant invention is a protection device for electrical equipment operating on a single or three phase alternating current power supplies. The device consists of an electrical circuit having at least one relay which is energized by at least one leg of an incoming power supply. The relay is energized by either a manual toggle or an automatic timer when the power supply is fully operational. Thus, upon placement of the device into an electrical line, power restoration after a power interruption is made possible only by manual initiation of the toggle or by an adjustable timer that counts down a preset period of time before initiation.

15 Claims, 4 Drawing Sheets

LOAD PROTECTOR

FIELD OF THE INVENTION

This invention relates to the protection of electrical loads and, in particular, to an electrical circuit positioned in a single or three phase power supply line for protecting electrical equipment from low voltage, line degradation, and/or single phase situations.

BACKGROUND OF THE INVENTION

The need to protect electrical equipment from power supply problems is well known. Power surges, power spikes, voltage overloads, low voltage conditions, and line degradation are but a few of the problems associated with power supplies.

Of particular concern are situations that result in either a total or partial loss of the power supply. If a total loss of power occurs, such as in a power failure, an unexpected restart of the serviced electrical equipment presents a dangerous situation to personnel, machinery, or to work in process. A low voltage power supply can cause similar problems, even if a power failure does not occur. This can be caused by a variety of circumstances such as overloaded power supply, inadequate wiring, or improper installation.

In motor control, a low control voltage produces low coil currents and a reduced magnetic pull. If the voltage is greater than the minimum control voltage (pick-up) needed to cause the armature to move, but less than the minimum control voltage (seal-in) required to cause the armature to seat against the pole faces of the control magnet, the result is a starter coil having armature chatter which can cause wear on the magnet faces but more importantly, can quickly cause the coil to heat up and burn out.

If the voltage falls below the seal-in value of a motor controller, it will cause the starter to drop out. When the voltage returns to a level high enough to pick up and seal, the started contacts will close allowing the motor to operate. The automatic restart is considered an advantage for unattended pumps, refrigerators, ventilating fans, and so forth. However, a simultaneous restart of multiple items may cause yet another low voltage situation and thereafter cause a cycle of shut downs.

Voltage problems may also result when an unintended path of electricity is established between an ungrounded conductor and the ground. This situation can occur not only from worn or defective electrical equipment but also misuse of equipment that is in otherwise good working order. Line degradation in an electrical system operating on three phase alternating current can be especially destructive to ancillary power loads. For instance, should line degradation occur causing loss in one leg of a three phase power supply, a single phasing of the power supply may occur. While the electrical equipment that required a three phase load is disabled, in many instances the ancillary loads are coupled to a remaining leg allowing their operation to continue. For this reason, protection for ancillary loads operating on a single phase may not exist. However, many types of electrical equipment cannot withstand an imbalance of voltage which may result in irreparable harm to the ancillary equipment.

Single phasing is of particular concern when the ancillary load performs a critical function. For example, industrial equipment requires three phase power for operation of large amperage loads making single phase operation impractical. However, most ancillary equipment including capacitors, computers, and the like control circuitry are designed to operate on single phase. Thus, a numerical control machine may utilize a computer which operates on a single phase drawn from one leg of the incoming three-phase power supply. If a single phase situation occurs, proper operation will discontinue but the leg supplying power to the computer may still be intact. In this manner the computer may be performing an important operation whose signals are lost if the motors requiring three phase operation are not capable of performing their function. The computer continues sending commands such as an indexing instruction and when full power is restored the computer may have indexed to a position eliminating critical processes that would have otherwise been performed. The result is material waste, wasted manufacturing time, as well as possible damage to the machinery.

Another problem with disruption to a three-phase power supply is that should line degradation occur, a restart may occur without warning resulting in a power spike, equipment cycling, or a low voltage situation due to an uncontrolled restart. For instance, a wire feed machine should have at least a fifteen minute delay to reset the sophisticated electronics before restarting. However, if a power failure occurs for thirty seconds, the result can be major rework, to the wire feeder. Battery backups are one method of addressing the problem but the expense makes it cost prohibitive for most companies.

This problem is not limited to three phase circuits. Should a single phase power supply be interrupted, a restart may also result in a power spike, equipment cycling, or a low voltage situation. For instance, a personal computer should have at least a ten second delay to assure that a restart will allow the software to cycle through each of its start-up commands. In addition, most sophisticated electronics operate on single phase wherein cycling of the equipment may result in irreparable damage to the electronics.

Thus, what is lacking in the art is a load protector capable of monitoring each leg of a power supply with provisions for interrupting power to the load should voltage in of the legs be interrupted.

SUMMARY OF THE INVENTION

The instant invention is a protection apparatus for electrical equipment operating on three-phase alternating current power supply with an alternative embodiment for operating on a single-phase power supply. Each leg of a power supply is monitored for lack of voltage and should any leg have insufficient voltage, the apparatus will cause a shutdown and allow restart only after each leg has sufficient voltage. In addition, a timer relay can be used to delay the restart for a particular time interval which can further be made adjustable. The apparatus can be integrated into a circuit or be placed in a separate housing for positioning between a power supply and electrical load.

In a primary embodiment, the apparatus monitors each leg of a power supply by use of relays that incorporate a coil sensitive to voltage variations. The three phase power supply provides a voltage application to each relay coil which in turn provides power to a controller circuit placed in series with the power supply. The controller will cause power interruption to all three legs should one leg be lost. Once power is restored the controller provides a delay before restart so as to provide the load bearing device sufficient time before scheduling a restart.

For example, damage to a home air conditioning unit can happen when the home owner is not present should a power supply have numerous interruptions or be cycled. Placement of the present invention in the power supply line will shut down the air conditioning unit should one leg of the three-phase system have low voltage and cause a restart only upon a predetermined delay. For air conditioning units, a start up delay of approximately three minutes is sufficient to allow circuit capacitors to drain thereby extending the life of the air conditioning equipment.

In operation on a three-phase power supply, line voltage is first monitored by thermal fuses and metal oxide varisitors (MOV) to protect against over current, power surges and/or lightning are pluggable modules. The MOV is replaceable in a similar manner as changing of a fuse. Proper operation of a power supply permits at least one relay to be energized having contact that complete a circuit between a switching mechanism and a control relay. The control relay is then energized by placement of a toggle switch into either a manual mode or an automatic mode. Manual mode causes a momentary initiation of the control relay, a contact of the relay coupled to a power supply is then opened to maintain voltage to the control relay. Automatic mode causes a timer count down before initiation of the control relay, which when energized, causes said contact of the control relay to open thereby maintaining voltage to the control relay. The automatic mode includes an electrical circuit having a logic sensor and internal power source. A light coupled to the control relay indicates proper operation of the timer relay.

Thus, an objective of the invention is to provide an inexpensive apparatus for the protection of electrical equipment from low voltage situations.

Another objective of the invention is to provide an apparatus that controls the restart of electrical equipment in a controlled manner allowing ancillary components to cool down before re-initiation.

Yet still another objective of the invention is to provide an apparatus having an adjustable delay between two seconds and five hours.

Still another objective of the invention is to provide an apparatus that monitors all three legs of a three-phase power supply and discontinues the power supply should any leg have insufficient voltage.

Yet another objective of the invention is to provide an apparatus that monitors all the neutral and hot leg of a single phase power supply and discontinues the power supply should any leg have insufficient voltage.

Another objective of this invention is to provide a method of surge and spike protection to the load. Also to be able to identify and replace this protective package when its useful life span has come to an end.

Another objective of this invention is to provide a method to those who are only interested in surge and spike protection, the option of just using the surge and spike protective package as a pluggable module in their power distribution panel. The same way they would add a circuit breaker they could inspect a surge and spike protector.

Other objectives and advantages of this invention will become apparent from the following description taken in conjunction with the accompanying drawing wherein are set forth, byway of illustration and example, certain embodiments of this invention. The drawing constitutes a part of this specification and includes an exemplary embodiment of the present invention.

DETAILED DESCRIPTION OF THE PREFERRED EMBODIMENT

Although the invention is described in terms of a specific embodiment, it will be readily apparent to those skilled in this art that various modifications, rearrangements and substitutions can be made without departing from the spirit of the invention. The scope of the invention is defined by the claims appended hereto.

Figure 1:
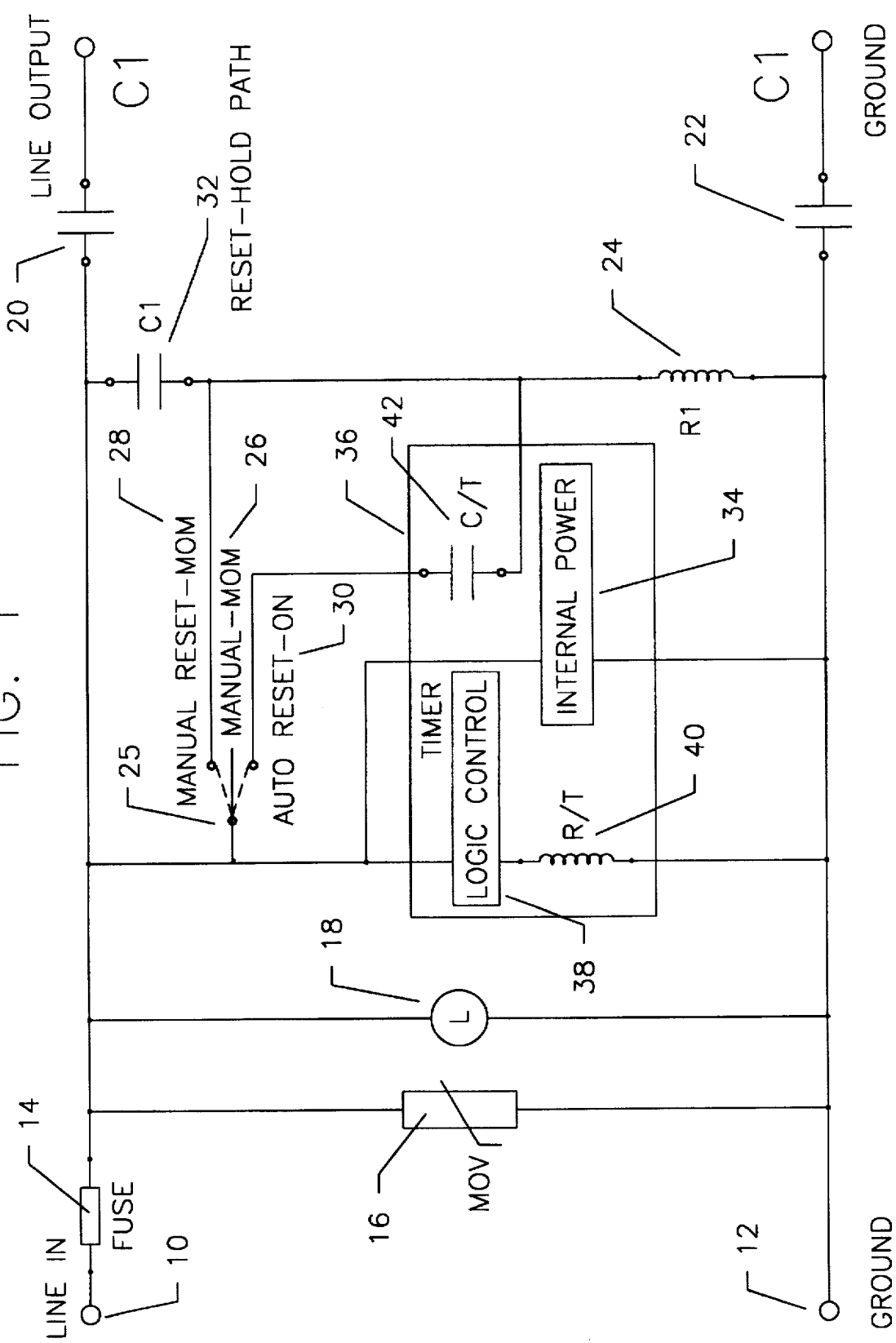
FIG. 1 is an electrical schematic of a single phase embodiment of the instant invention.

Now referring to FIG. 1, set forth is an electrical embodiment of 120-volt single phase circuitry having a power line as depicted by numeral 10 and a neutral line as depicted by numeral 12. The power line includes an in-line fuse 14 of the thermal element type that will break the current, should an excess amount of current flow through the positive line 10. Between lines 10 and 12 is a MOV 16 which will disengage if an excess voltage is present in the lines and which is easily replaced, should such an excess voltage occur. Lamp 18 indicates that voltage is present in the power line 10 and neutral line 12.

A relay with numerous contacts is configured and connected to break electrical connections in various circuit paths when power is interrupted in the power lines. Contacts C1, as depicted by numeral 20 in the positive line 10, and 22 in the neutral line 12, are operatively controlled by relay coil R1, depicted by numeral 24. Contact 32, which is placed in series with the relay coil 24 between the positive line 10 and neutral line 12, is also operatively controlled by relay coil 24.

R1 is made operational by switching mechanism 25, having a manual off position 26, manual reset position 28, and an auto reset-on position 30. In the manual off position 26, no current is allowed to flow from positive line 10 to relay 24. If the switch 25 is placed in a manual reset position 28, there is a momentary contact that allows current to flow from positive line 10 to relay 24 which opens contact 20, 22, and contact 32. Contact 32 maintains relay 24 in an energized state in combination contacts 20 and 22 across positive line 10 and neutral line 12, thereby allowing voltage to flow through line 10 and 12 from the power source to the electrical load. Contact 32 maintains R1 in an energized state, even when the manual reset 28 is released. Should any power interruption occur in positive line 10 or neutral line 12, the relay 24 would be disengaged, thereby interrupting power to contacts 20 and 22. Also the interruption in power will further disengage contact 32, requiring reset of the switch if operation is to continue.

If the switch is in the auto reset position 30, then when power is unavailable or interrupted, the internal power 34 inside the timer 36 provides power to the logic controller 38 which generates logic control voltages as required to provide a delay period. After this delay period has passed, a timer relay 40 is energized which is operatively associated with a relay timer contact 42. When the timer relay 40 is energized, the relay timer contact 42 is closed. Voltage from power line 10 is directed to relay 24, thereby causing relay 24 to be energized, and closing contacts 20 and 22. This allows current to flow to the equipment load. Additionally, contact 32 closes, allowing the relay 24 to be maintained in an energized position, with voltage flowing through contact 32 as well as contact 42.

Figure 2:
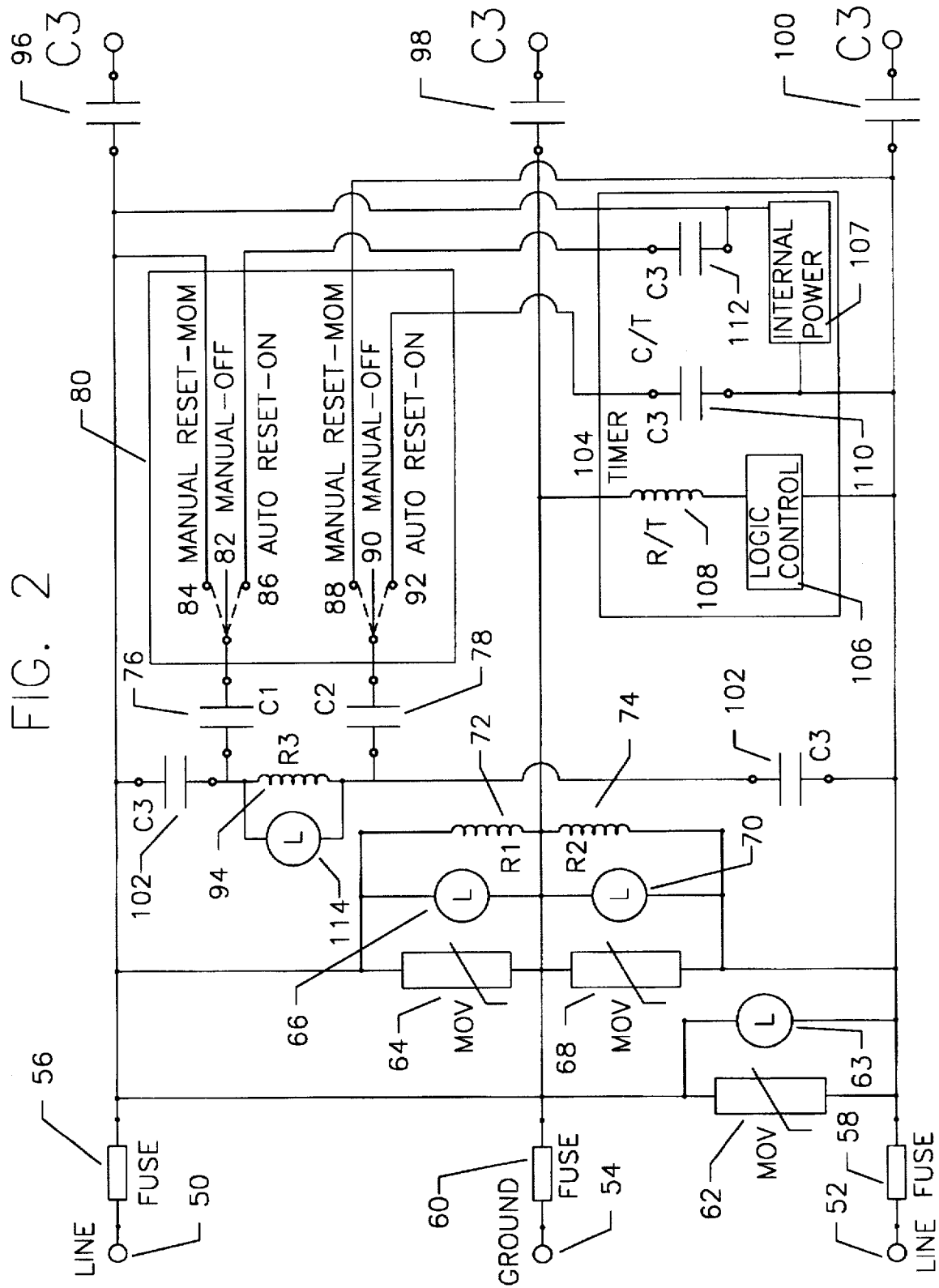
FIG. 2 is an electrical schematic of a 220-volt single phase embodiment of the instant invention.

Now referring to FIG. 2, the same concept is applied in a 120-volt single-phase scenario in which a first line 50, a second line 52, and a third line considered neutral 54 is provided from a power source. Thermal fuse 56 is placed in line 50, fuse 58 is placed in line of 52, and fuse 60 is placed in line of 54. High voltage protection is provided across each of the lines for use of an MOV device. In this manner, MOV 62 bridges power line 50 and 52, and should a high voltage occur in either line, the MOV 62 will become disengaged. Lamp 64 is placed between lines 50 and 52, providing an indication of proper line operation. Similarly, MOV 64 is coupled between lines 50 and 54, with indicating lamp 66 providing visual indication of line 50 and 54 operation. MOV 68 is coupled between lines 54 and 52, with indicating lamp 70 providing visual indication of line operation.

A first relay 72 is coupled between lines 50 and 54, and a second relay 74 is coupled between lines 54 and 52. First relay 72 and a second relay 74 each have a respective contact 76 and 78 which is closed by the energizing of each respective relay coil. If the power on both lines and the neutral is properly connected, then the relays 72 and 74 will be energized and the contacts 76 and 78 will be closed.

As similar to the previous single phase embodiment, a switch 80 is provided, having a first portion of the switch with an off position 82, a manual reset position 84, and an auto reset position 86, which is coupled to line 50. Line 52 is similarly connected to the switch 80, with a second portion of the switch having a manual reset 88, a manual off position 90, and an auto reset position 92.

A third relay R3, shown as relay coil element 94, is provided which is operatively associated with contact points 96, 98, 100, 102, and 104. Relay coil 94 is connected between lines 50 and 52 with a contact point 102 and 104 in series above and below the coil 94. Assuming the lines 50 and 52 are correctly connected, then relay coils 72 and 74 will be energized and contacts 76 and 78 will be closed. Therefore, when the switch 80 is placed in a manual reset position 84 and 88, line 50 is coupled to the first side of the relay 94 through the switch, and through contact 76. The other side of the relay 94 is connected to line 52 as well through the manual reset portion of the switch 88 and through contact 78. Relay 94 is then energized, causing contacts 96, 98, and 100 to close, thereby coupling the power source to the electrical load. Energization of relay coil 94 further closes contacts 102 and 104, thereby causing R3 to remain in an energized state when the manual reset is disengaged. This allows the power source to remain connected to the electrical load until a loss in voltage in one of the lines 50, 52, or 54 occurs. When the switch 80 is set in the manual off position, as depicted by numeral 82 and 90, the power source is disconnected from the electrical load and the circuit will continue to operate in its last known state.

In the auto reset positions, a logic control box or timer 104 is operatively connected to relay contacts 76 and 78. This timer circuitry has logic control circuitry 106 which produces an adjustable delay period, and an internal power source 107 to power the control circuitry. The timer also includes a timer relay coil 108 and contacts 110 and 112 which are operatively closed by the energized coil 108.

When the switch 80 is placed into the auto reset positions, as depicted by numerals 86 and 92, the switches remain in that position until otherwise switched to another position.

When power is interrupted in lines 50, 52, and/or 54, the logic controller 106 is energized thereby initiating the circuitry to initiate a time delay and count down a predetermined amount of time, which may be made adjustable. Upon completion of the delay, the timer relay coil 108 is energized, which causes control contacts 110 and 112 to be closed. This in turn causes power from line 50 to pass through contact 112, through auto reset switch 86, and through contact 76 to the first side of relay coil 94. Power from line 52 passes through contact 110, through auto reset switch 92, and then through contact 78 to the other side of relay coil 94. Relay coil 94 is thereby energized.

As previously mentioned, when relay 94 is energized, contacts 96, 98 and 100 are closed, allowing voltage to flow from the power source to the electrical load. In addition, contacts 102 and 104 are closed, thereby maintaining power to relay 94, even if the switch is later placed into the off position. Light 114 provides visual indication that power is being supplied to relay 94. If any line drops out, relay 72 and/or 74 would disengage contact 76 and 78, causing the system to default with restart available only through the manual reset or the auto reset, depending upon the location of switch 80.

Figure 3:
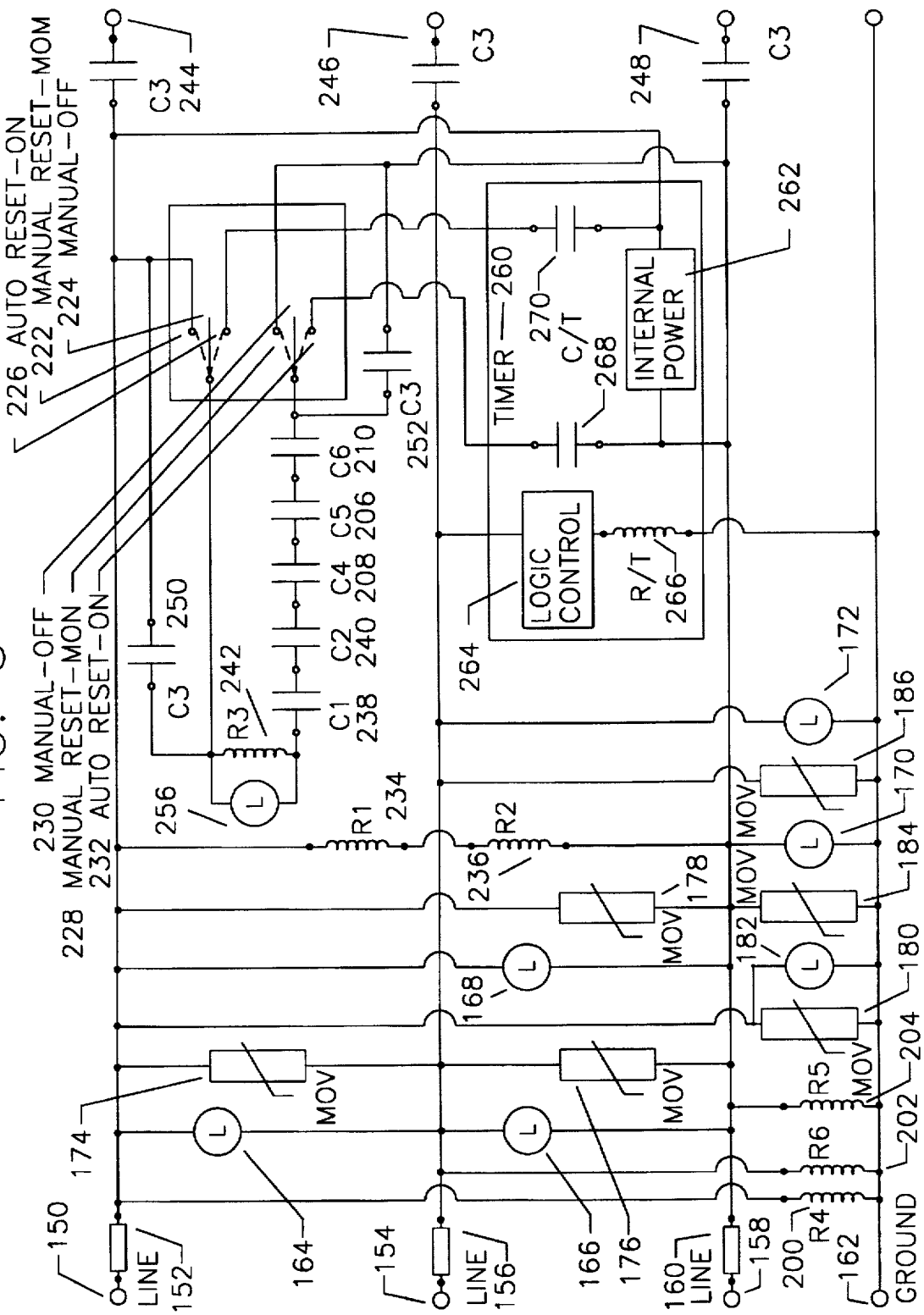
FIG. 3 is a three-phase embodiment of the instant invention.

Now referring to FIG. 3, set forth is a three-phase embodiment of the instant invention which incorporates the principles of the first two embodiments. The circuitry is depicted by a power source having incoming lines 150 with thermal fuse 152, line 154 with thermal fuse 156, line 158 with fuse 160, and a neutral ground power source line 162. As with the previous embodiments, each line has light to indicate proper operation. Lamp 164 is coupled between lines 150 and 154. Lamp 166 is coupled between lines 154 and 158. Lamp 168 is coupled between lines 150 and 158. Lamp 170 is coupled between lines 158 and the neutral line 162. Lamp 172 is coupled between line 154 and the neutral ground line 162. Replaceable MOV 174 is coupled between line 150 and 154. MOV 176 is coupled between lines 154 and 158. MOV 178 is coupled between lines 150 and 158. A ground fault MOV element is placed between line 150 and 162 as depicted by element 180, and having indicating light 182. MOV 184 is coupled between lines 158 and the neutral ground 162. MOV 186 is coupled between line 154 and neutral ground 162.

As with the previous embodiments, relays are coupled in the primary line, as depicted by relay 200, 202, and 204. Each relay operatively controls a respective contact, with the contact being closed when the relay coil is energized, with relay 200 having contact 206, relay 202 having contact 208, and relay 204 having contact 210. Each contact is placed in a series arrangement, wherein voltage must be present in each line in order for the contact to be closed thereby allowing voltage to flow through each series connected contact.

In this manner, a similarly situated switch 220 is depicted with the switch having a two-pull toggle, wherein one pull has a manual reset 222, a manual off position 224, and an auto reset-on position 226. The second pull has a manual reset 228, a off position 230, and an auto reset position 232. Similarly, relay 234 is coupled to lines 150 and 154, and relay to 236 is coupled between lines 154 and 158. Relay 234 is operatively associated with contact 238, and relay 236 is operatively associated with contact 240. Contacts 238 and 240 are also placed in series with contacts 206, 208, 210, wherein each relay monitors the voltage across each input line so as to accommodate every scenario in which one or a multiple number of input lines may lose power. In the event of such power failure, any one of the aforementioned contacts would be closed and prohibit voltage from passing therethrough.

In operation line 150 provides power through switch 220 the relay coil 242. When the switch is placed into a manual reset, power is supplied to relay 242 which operatively controls contacts 244, 246, 248, 250 and 252. The second pull 228 of switch 220 would also depict a manual reset providing voltage input from line 158. When relay 242 is energized, the power source coupled to lines 150, 154 and 158 is passed through contacts 244, 246 and 248 respectively to the load. Lamp 256 depicts operation of relay 242 providing indication of power thereto.

The automatic reset position of this embodiment is similar in function to the first two embodiments, wherein placement of switch 220 into the auto reset position, as depicted by numerals 226 and 232, allows operation of the logic controller 260, wherein internal power source 262 provides voltage to the logic control circuit 264, which in turn operates provides a delay for the timer relay 266. Timer relay 266 operatively controls contacts 268 and 270. When the relay 266 is energized, the contacts 268 and 270 are closed thereby coupling power line 158 through contact 268 and through the auto reset 232 to one end of the relay coil 242. Line 150 is also coupled through contact 270 and through the auto reset 226 to the other end of the relay coil 242. Hence, the coil is energized and contacts 244, 246, 248, 250, and 252 are closed.

Accordingly, an interruption of power will cause a break in contacts 206, 208, 210, 238, and/or 240. However, when switched into the auto-reset positions 226 and 232, the logic control 264 is activated and counts down and energizes relay timer 266. Contacts 268 and 270 close thereby allowing operation in a similar manner as the manual reset position which provides power to relay 242, thereby causing contacts 244, 246 and 248 to close. As previously mentioned, upon close of these contacts 244, 246, and 248, the power source is coupled to the equipment load. Lamp 246 indicates proper operation of the relay 242. Contacts 250 and 252 similarly close thereby allowing the relay 242 to remain energized when the switch 220 is returned to the manual-off positions 224 and 230.

Figure 4:
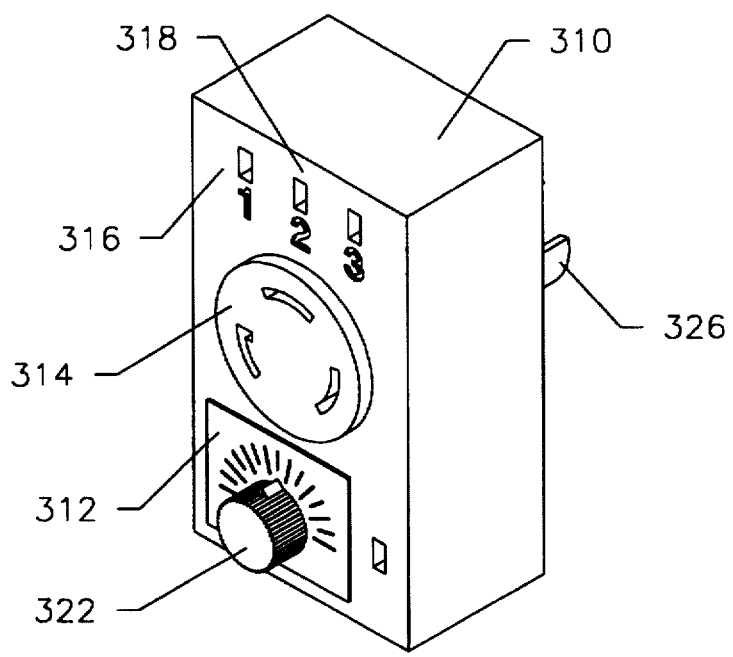
FIG. 4 is a pictorial view of a control box having the electrical circuitry of the instant invention enclosed therein for placement in line between a power supply and an electrical load.
Figure 5:
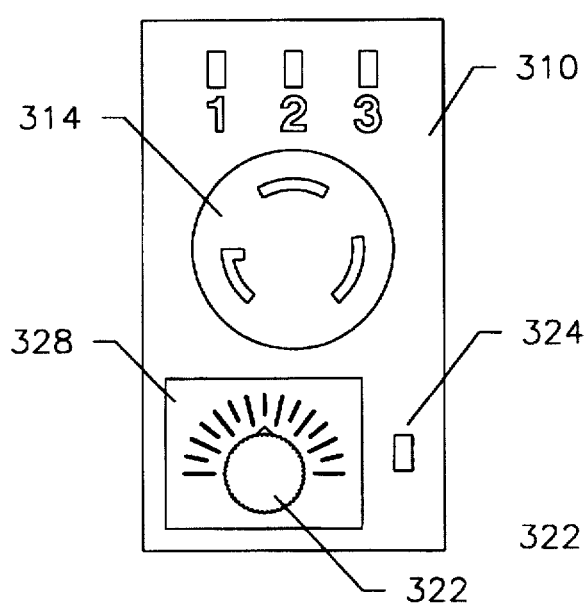
FIG. 5 is a front view of FIG. 4.
Figure 6:
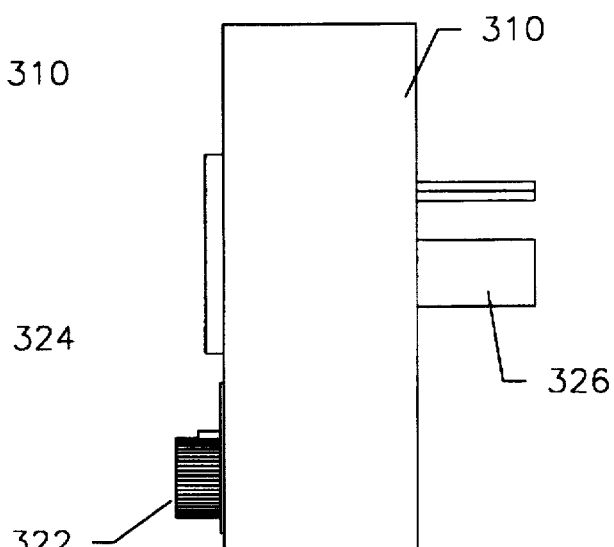
FIG. 6 is a side view of FIG. 4.

Referring to FIGS. 4–6 set forth is an example of a self contained housing having an insulated enclosure 210 with frontal surface 212 for placement of a receptacle 214 for insertion of an electrical plug when used with a three-phase power cord installation. It is noted that the openings of receptacle 214 is dependant upon the particular three-phase service operation and associated plug. The receptacle allowing for in-line placement between a power supply and an electrical load, the receptacle modifiable for a particular power cord shapes.

Each leg of the three-phase power supply is visually monitored by use of LED light 216 placed on the first leg, LED light 218 placed on the second leg and LED light 220 placed on the third leg. This provides the operator with visual depiction of proper operation for each leg and as previously mentioned in this specification includes a MOV load protector Which will allow shutdown of a particular leg should an uncontrolled power surge occur.

Control knob 222 allows manual adjustment of the a timer to allow an operator to adjust the time delay once a power interruption occurs before voltage is allowed to continue from power supply to the electrical equipment. LED enumerated 224 provides visual indication that counter is in operation. The rear of the enclosure includes a male plug 226 for insertion to a wall socket allowing the apparatus to be supported by a wall socket during in-line placement.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. An apparatus for use in conjunction with a power supply for protection of electrical equipment operating on single phase power supplies, said apparatus comprising:

a first relay means with a relay coil and a plurality of normally open contacts operatively associated with said coil, whereby said contacts are closed when said coil is energized;

a positive power line and a neutral ground line connected between a source and a load, said power line bridged by a first of said contacts, and a ground line bridged by a second of said contact;

said first relay means connected in series with a third said contact and coupled between said power and ground lines and between said source and load, whereby said relay disengages when power is interrupted in said power or ground lines;

a manual switching means with a first switching position electrically coupled to momentarily provide power, energize said relay means, and close said first, second, and third contacts thereby allowing power to be transmitted from source to load;

a second switching position whereby no electrical contacts are made;

and a third switching position electrically coupled to a timer means having an internal power source and a logic control circuit which controls a second timer relay means with an operatively associated timer relay contact which is connected between said power source and said first relay means, whereby after an interruption of power, said circuit generates a preset delay, whereby after said delay said timer relay is energized, thereby causing said timer relay contact to close and said first relay means to be energized, thereby closing said first, second, and third contacts and reestablishing connection between said source and said load.

2. The apparatus according to claim 1 including a light coupled between said power and ground lines to indicate an uninterrupted power connection.

3. The apparatus according to claim 1 including an MOV coupled between said power and ground lines to absorb voltage surges.

4. The apparatus according to claim 1, wherein said timer means includes a count down timer.

5. The apparatus according to claim 1, wherein said timer means provides an adjustable delay.

6. The apparatus according to claim 1, wherein said delay is adjustable between 2 seconds and 5 hours.

7. The apparatus according to claim 1, including a housing means for containing said relay means, switch means, and timer means.

8. An apparatus for use in conjunction with a power supply for protection of electrical equipment operating on single phase power supplies, said apparatus comprising:

a first positive power line, a second positive power line, and a neutral ground line connected between a source and a load;

a first relay means with a first coil and a first normally open contact operatively associated with said coil, said contact being closed when said coil is energized, said relay coil connected between said first power line and said neutral line, whereby said relay disengages when power is interrupted in said first power or ground lines;

a second relay means with a second coil and a second normally open contact operatively associated with said coil, said contact being closed when said coil is energized, said relay coil connected between said second power line and said neutral line, whereby said relay disengages when power is interrupted in said second power or ground lines;

a third relay means with a third relay coil with a first and second end, and third, fourth, fifth, sixth, and seventh normally open contacts operatively associated with said coil, whereby said contacts are closed when said coil is energized, said relay coil connected in series with said third and fourth contacts between said first and second power lines, with said third and fourth contacts on either side of said coil;

said first positive power line, second positive power line, and neutral ground lines bridged by said fifth, sixth, and seventh contacts respectively;

a manual switching means with a first and second switching pole, said first switching pole connected to said first contact which is connected to said first end of said third relay coil, said second switching pole connected to said second contact which is connected to said second end of said third relay coil;

each said switching pole having:
  a first switching position electrically coupled to momentarily provide power, energize said third relay means, and close said third, fourth, fifth, sixth, and seventh contacts thereby allowing power to be transmitted from source to load;
  a second switching position whereby no electrical contacts are made;
  and a third switching position electrically coupled to a timer means having an internal power source and a logic control circuit which controls a fourth timer relay means with an operatively associated eight and ninth timer relay contacts, said eighth contact connected between said first power line and said first contact, said ninth contact connected between said second power line and said second contact, whereby after an interruption of power, said circuit generates a preset delay, whereby after said delay said fourth timer relay is energized, thereby causing said eighth and ninth timer relay contacts to close and said third relay means to be energized, thereby closing said third, fourth, fifth, sixth, and seventh contacts and reestablishing connection between said source and said load.

9. The apparatus according to claim 8 including a first light coupled between said first power and ground lines, and a second light coupled between said second power and ground lines to indicate respective uninterrupted power connections, and a third light coupled across said third relay coil to indicate energization of said relay.

10. The apparatus according to claim 8 including a first MOV coupled between said first power and ground lines, a second MOV coupled between said second power and ground lines, and a third MOV coupled between said first and second power lines to thereby absorb voltage surges between said lines.

11. The apparatus according to claim 8, wherein said timer means includes a count down timer.

12. The apparatus according to claim 8, wherein said timer means provides an adjustable delay.

13. The apparatus according to claim 8, wherein said delay is adjustable between 2 seconds and 5 hours.

14. The apparatus according to claim 8, including a housing means for containing said relay means, switch means, and timer means.

15. An apparatus for use in conjunction with a power supply for protection of electrical equipment operating on three phase power supplies, said apparatus comprising:

a first positive power line, a second positive power line, a third positive power line, and a neutral ground line connected between a source and a load;

a first, second, and third relay means with a first, second, and third respective coil and a first, second, and third respective normally open contact operatively associated with each said coil, each said respective contact being closed when each said respective coil is energized, said first relay coil connected between said first power line and said neutral line, said second relay coil connected between said second power line and said neutral line, and said third relay coil connected between said third power line and said neutral line, whereby each said relay disengages when power is interrupted in said lines;

a fourth relay means with a fourth coil and a fourth normally open contact operatively associated with said coil, said contact being closed when said coil is energized, said relay coil connected between said second power line and said third power line, whereby said relay disengages when power is interrupted in said second power or third power lines;

a fifth relay means with a fifth relay coil and a fifth normally open contact operatively associated with said coil, whereby said contact is closed when said coil is energized, said relay coil connected between said first and second power lines;

a sixth relay means with a sixth relay coil with a first and second end, and sixth, seventh, eighth, ninth, and tenth normally open contacts operatively associated with said coil, whereby said contacts are closed when said coil is energized, said relay coil connected in series with said sixth and seventh contacts between said first and second power lines, with said sixth and seventh contacts placed on either side of said coil;

said first positive power line, second positive power line, third positive power line bridged by said eighth, ninth, and tenth contacts respectively;

a manual switching means with a first and second switching pole, said first switching pole connected to a first end of said third relay coil, said second switching pole connected to said second contact which is connected to a second end of said third relay coil;

each said switching pole having:
  a first switching position electrically coupled to momentarily provide power, energize said sixth relay means, and close said sixth, seventh, eighth, ninth, and tenth contacts thereby allowing power to be transmitted from source to load;
  a second switching position whereby no electrical contacts are made;

and a third switching position electrically coupled to a timer means having an internal power source and a logic control circuit which controls a seventh timer relay means with an operatively associated eleventh and twelfth timer relay contacts, said eleventh contact connected between said third power line and said eighth relay, said twelfth contact connected between said first power line and said eighth relay, whereby after an interruption of power, said circuit generates a preset delay, whereby after said delay said seventh timer relay is energized, thereby causing said eleventh and twelfth timer relay contacts to close and said eighth relay means to be energized, thereby closing said sixth, seventh, eighth, ninth, and tenth contacts and reestablishing connection between said source and said load.

* * * * *